US011609658B1

United States Patent
Lee et al.

(10) Patent No.: US 11,609,658 B1
(45) Date of Patent: Mar. 21, 2023

(54) TOUCHSCREEN DISPLAY FLICKER

(71) Applicant: STMicroelectronics Asia Pacific Pte Ltd., Singapore (SG)

(72) Inventors: Sang soo Lee, Seoul (KR); Chan Hyuck Yun, Yongin-si (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 17/679,623

(22) Filed: Feb. 24, 2022

(51) Int. Cl.
 *G06F 3/041* (2006.01)
 *G09G 3/3208* (2016.01)
 *G06F 3/044* (2006.01)

(52) U.S. Cl.
 CPC ....... *G06F 3/04166* (2019.05); *G09G 3/3208* (2013.01); *G06F 3/0446* (2019.05); *G09G 2310/0202* (2013.01); *G09G 2310/08* (2013.01); *G09G 2320/0247* (2013.01)

(58) Field of Classification Search
 CPC . G06F 3/04166; G06F 3/0446; G09G 3/3208; G09G 2310/0202; G09G 2310/08; G09G 2320/0247
 See application file for complete search history.

(56) References Cited

U.S. PATENT DOCUMENTS

2017/0047023 A1*  2/2017  Matsui .................... G09G 3/36

\* cited by examiner

*Primary Examiner* — Robin J Mishler
(74) *Attorney, Agent, or Firm* — Slater Matsil, LLP

(57) ABSTRACT

A method for operating an electronic device, including: determining that a touchscreen is in a low frequency display (LFD) mode, determining whether a self-sensing scan was performed in a previous frame of a plurality of frames; after determining, a self-sensing scan was performed in the previous frame, determining a current duration of time corresponding to a current frame based on a previous duration of time corresponding to the previous frame, the previous frame being a frame immediately preceding the current frame; determining, whether the current duration of time is greater than the previous duration of time; and after determining that the current duration is greater than the previous duration, performing a self-sensing scan after the current duration of time, the current duration of time being measured from a beginning of the current frame, the current duration of time having a duration less than a duration of the current frame.

21 Claims, 11 Drawing Sheets

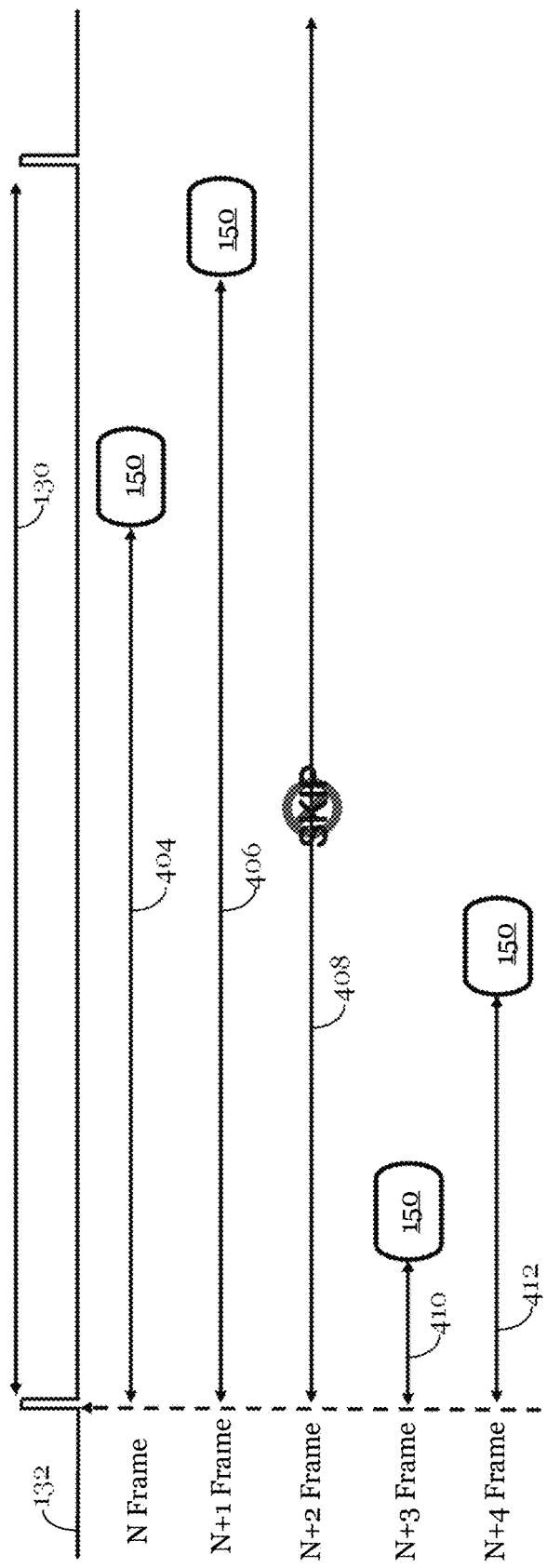

TOUCHSCREEN DISPLAY FLICKER

CROSS-REFERENCE TO RELATED APPLICATIONS

This application is related to co-pending U.S. Non-Provisional application Ser. No. 17/456,832, filed on Nov. 29, 2021, which is hereby incorporated herein by reference.

TECHNICAL FIELD

The present invention relates generally to systems and methods for operating displays, and in particular embodiments to touchscreen displays.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Organic light emitting diodes (OLEDs) offer a higher performance display. OLED display provide a high contrast self-illuminating display with a low driving voltage and high luminous efficiency.

However OLED displays come with their own set of advantages and disadvantages. A display panel of an OLED based touchscreen may include a plurality of pixels arranged in rows and columns across a display layer in a matrix like formation. Each pixel may include an OLED configured to generate light based on the current driven through it.

In order to conserve power an OLED display may be operated in an active mode and a low frequency display (LFD) mode. When an OLED display is operating in active mode the touchscreen may be refreshed (e.g. updated) in each of a plurality of display frames defined by a vertical synchronization signal (Vsync). In active mode, during each display frame each row of pixels are updated sequentially and touch sensing scans (e.g. mutual and self-sensing scans) are performed. The touch sensing scans are performed at the same starting position in each of the frames.

On the other hand, in order to conserve power, OLED displays may also be operated in a low frequency display (LFD) mode. For example OLED displays may operate in LFD mode when they are displaying a static image or in always on mode. When an OLED display is in LFD mode it is refreshed at a frequency lower than the frequency of Vsync. In other words, the OLED display is only updated in certain frames according to the second frequency. However, when self-sensing scans are performed in LFD mode, the additional current draw combined with the reduced refresh rate may result in a noticeable display flicker to a user.

SUMMARY

In an embodiment, a method for operating an electronic device includes: in response to determining, by a touchscreen controller, that a touchscreen is in a low frequency display (LFD) mode, determining whether a self-sensing scan was performed in a previous frame of a plurality of frames; in response to determining, by the touchscreen controller that a self-sensing scan was performed in the previous frame, determining a current duration of time corresponding to a current frame of the plurality of frames based on a previous duration of time corresponding to the previous frame, the previous frame being a frame immediately preceding the current frame; determining, by the touchscreen controller, whether the current duration of time is greater than the previous duration of time; and in response to determining that the current duration of time is greater than the previous duration of time, performing, by the touchscreen controller, a self-sensing scan after the current duration of time, the current duration of time being measured from a beginning of the current frame, the current duration of time having a duration less than a duration of the current frame.

In an embodiment, a method for operating an electronic device includes: determining, by a touchscreen controller, whether a touchscreen is in a low frequency display (LFD) mode; and in response to determining that the touchscreen is in the LFD mode, performing a plurality of self-sensing scans, a brightness of the touchscreen before, during, and after each of the self-sensing scans being maintained by starting each of the self-sensing scans at different scan start times measured with respect to a start time of a corresponding frame of a plurality of frames.

In an embodiment, a device includes: a touchscreen; a touchscreen controller; a memory for storing a program to be executed in the touchscreen controller, the program including instructions when executed cause the touchscreen controller to: determine, that the touchscreen is in a low frequency display (LFD) mode; in response to determining, that the touchscreen is in the LFD mode, determine whether a self-sensing scan was performed in a previous frame of a plurality of frames; in response to determining that a self-sensing scan was performed in previous first frame of a plurality of frames, determine a current duration of time corresponding to a current frame of a plurality of frames based on a previous duration of time corresponding to a previous frame, the previous frame being a frame immediately preceding the current frame; determine, whether the current duration of time is greater than the previous duration of time; and in response to determining that the current duration of time is greater than the previous duration of time, perform a self-sensing scan after the current duration of time, the current duration of time being measured from a beginning of the current frame, the current duration of time having a duration less than a duration of the current frame.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1H illustrate an electronic device configured to prevent display flicker according to an embodiment of the present application, wherein FIG. 1A illustrates a component schematic of the electronic device, FIG. 1B illustrates a component schematic of a touchscreen, FIG. 1C illustrates a component schematic of a display stack up of the touchscreen, and FIG. 1D illustrates a component schematic of a display layer of the electronic device, FIG. 1E illustrates a graphical representation of a touchscreen being refreshed, FIG. 1F illustrates a graphical representation of a touchscreen being refreshed in active mode and low frequency display (LFD) mode, FIG. 1G illustrates a component schematic of a touch sensitive layer of the electronic device, and FIG. 1H illustrates graphical representations of a conventional timing of self-sensing scan when a touchscreen is operated in LFD mode;

FIGS. 4A-4B illustrates schematic diagrams for preventing flicker when a touchscreen is in LFD mode according to an embodiment of the present application, where FIG. 4A illustrates a schematic diagram for calculating a duration of time corresponding to a plurality of frames, and FIG. 4B illustrates a timing diagram for preventing flicker when a touchscreen is in LFD mode.

DETAILED DESCRIPTION OF ILLUSTRATIVE EMBODIMENTS

Conventional organic light emitting diode (OLED) devices may include a display panel that may include a plurality of pixels arranged in rows and columns across a display layer in a matrix like formation. In order to conserve power, OLED displays may be operated in active mode and a low frequency display (LFD) mode. In active mode, the OLED display may be refreshed in each of a plurality of frames distinguished by a frequency of a vertical synchronization signal (Vsync). The OLED display may be updated by refreshing each row of pixels sequentially from top to bottom of the display in each frame.

On the hand, to conserve power, the OLED display may be operated in LFD mode. When an OLED display is in LFD mode it is refreshed at a frequency lower than the frequency of Vsync. For example, the display may be operated in LFD mode when the OLED display is in always on mode or displaying a static image. During LFD mode the display is updated at a frequency that is less than the frequency of Vsync. In other words, the OLED display is only updated in certain frames according to the second frequency.

However, the inventors identified that when self-sensing scans are performed at the same start position within each display frame in LFD mode, an additional current draw required for a self-sensing scan may dim the brightness of the touchscreen. Because the display is updated row by row when it is refreshed, the additional current draw may occur while the same row is being updated during each refresh. This increased current draw, combined with the reduced refresh rate may result in a noticeable display flicker.

Embodiments of the present application relate to a method for preventing display flicker when an electronic device is in LFD mode. Particular embodiments of the present application relate to staggering the start time of self-sensing scans to prevent noticeable display flicker in LFD mode.

Figure 1A:
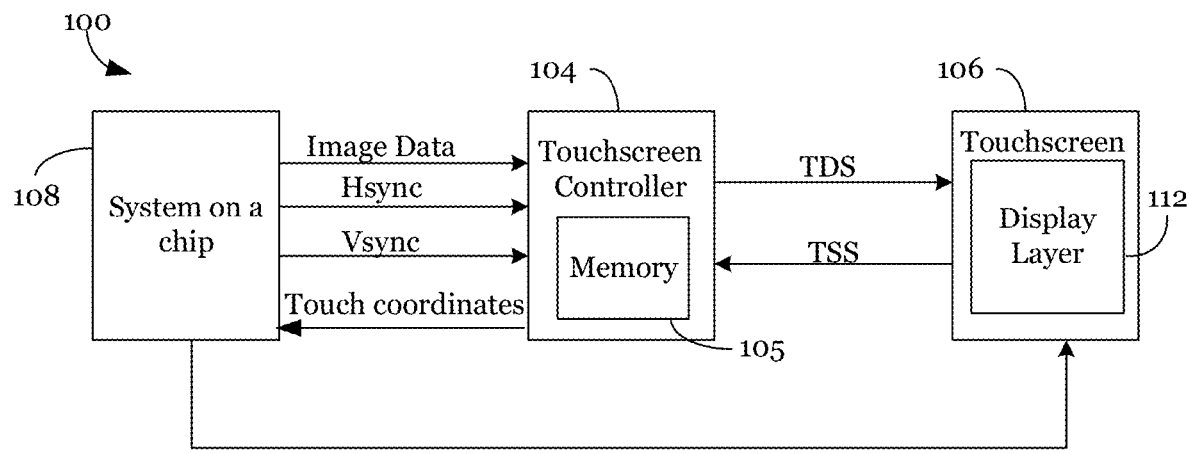
Figure 1B:
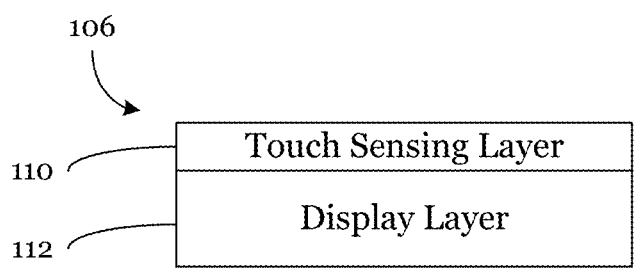
Figure 1C:
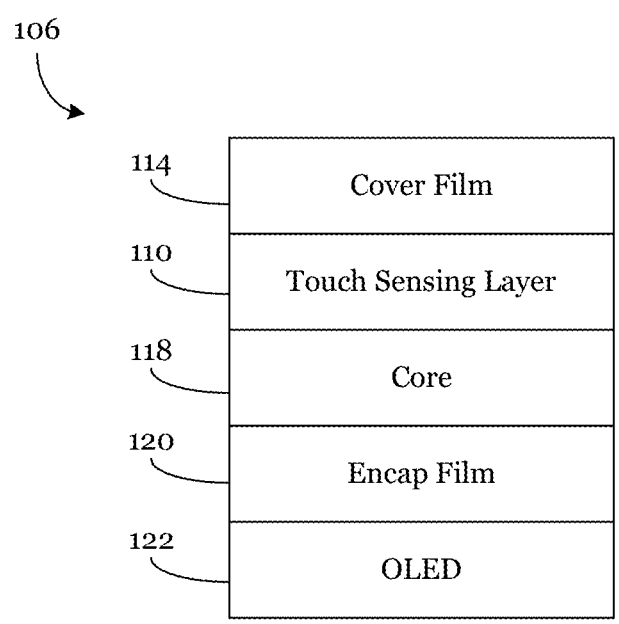
Figure 1D:
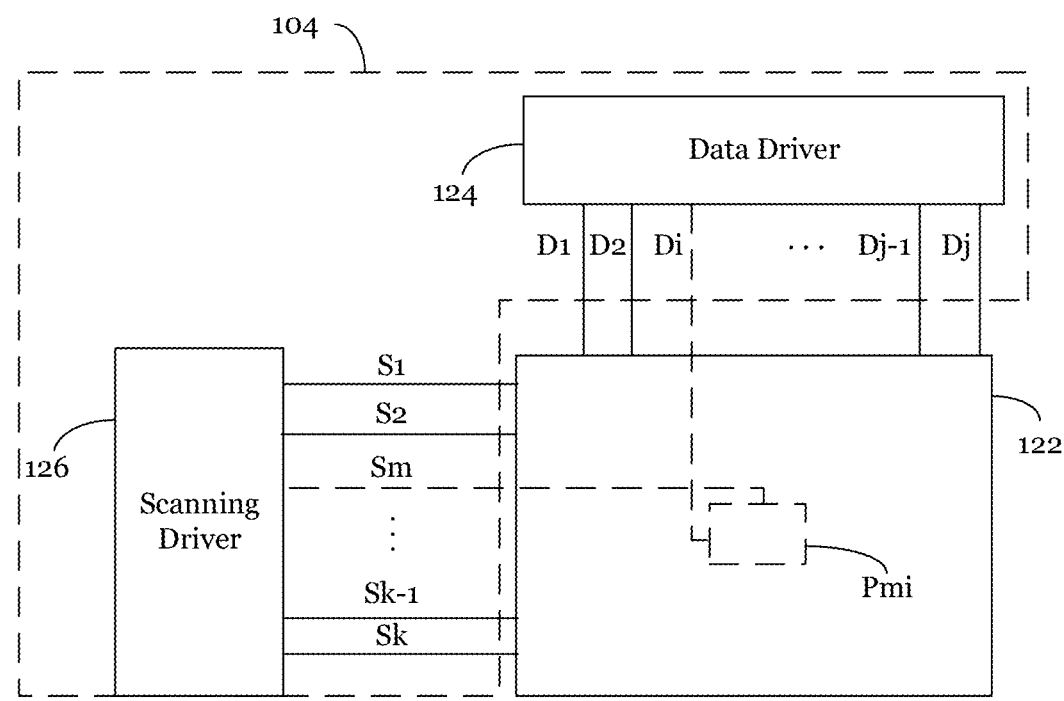
Figure 1E:
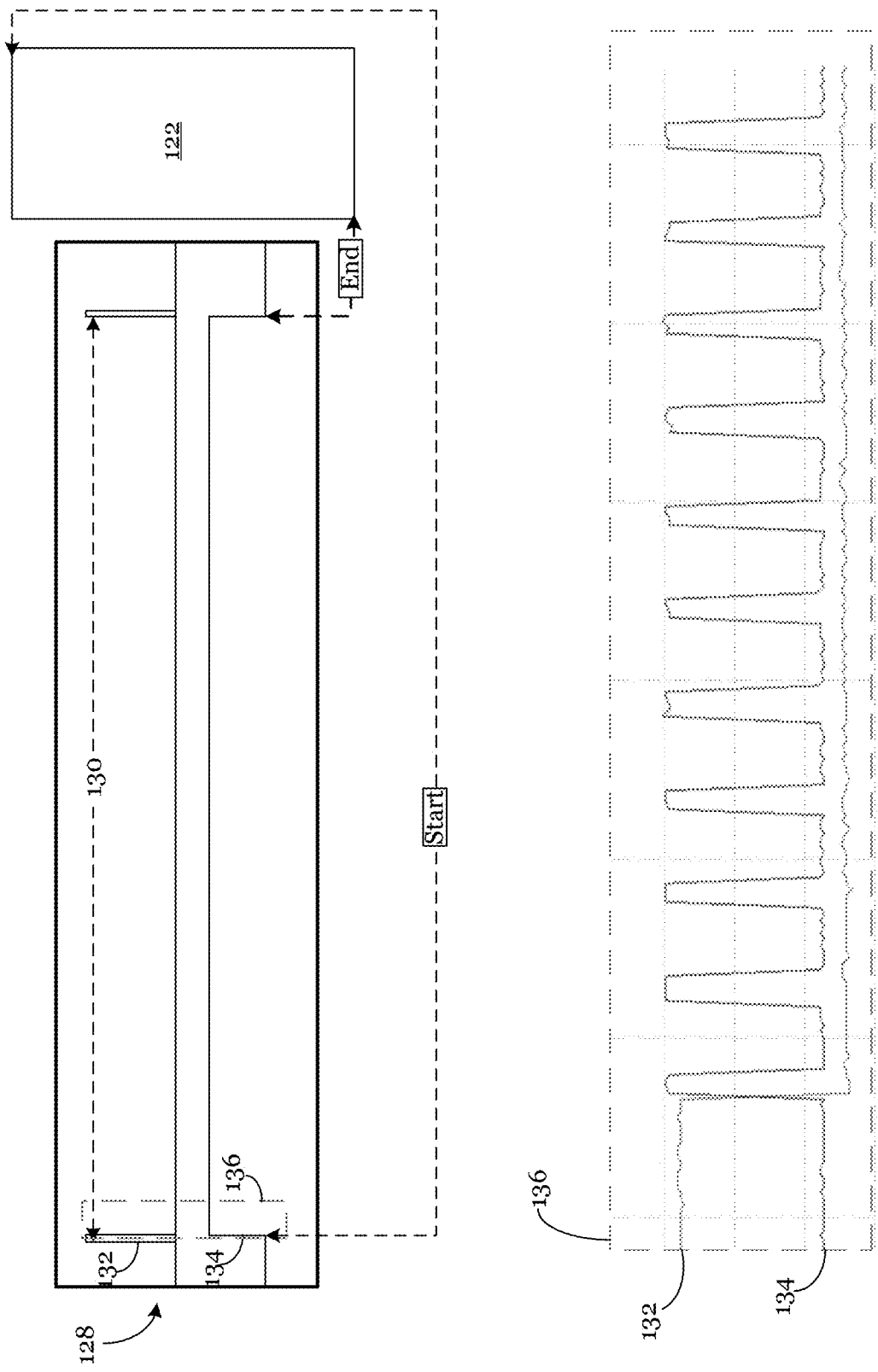
Figure 1F:
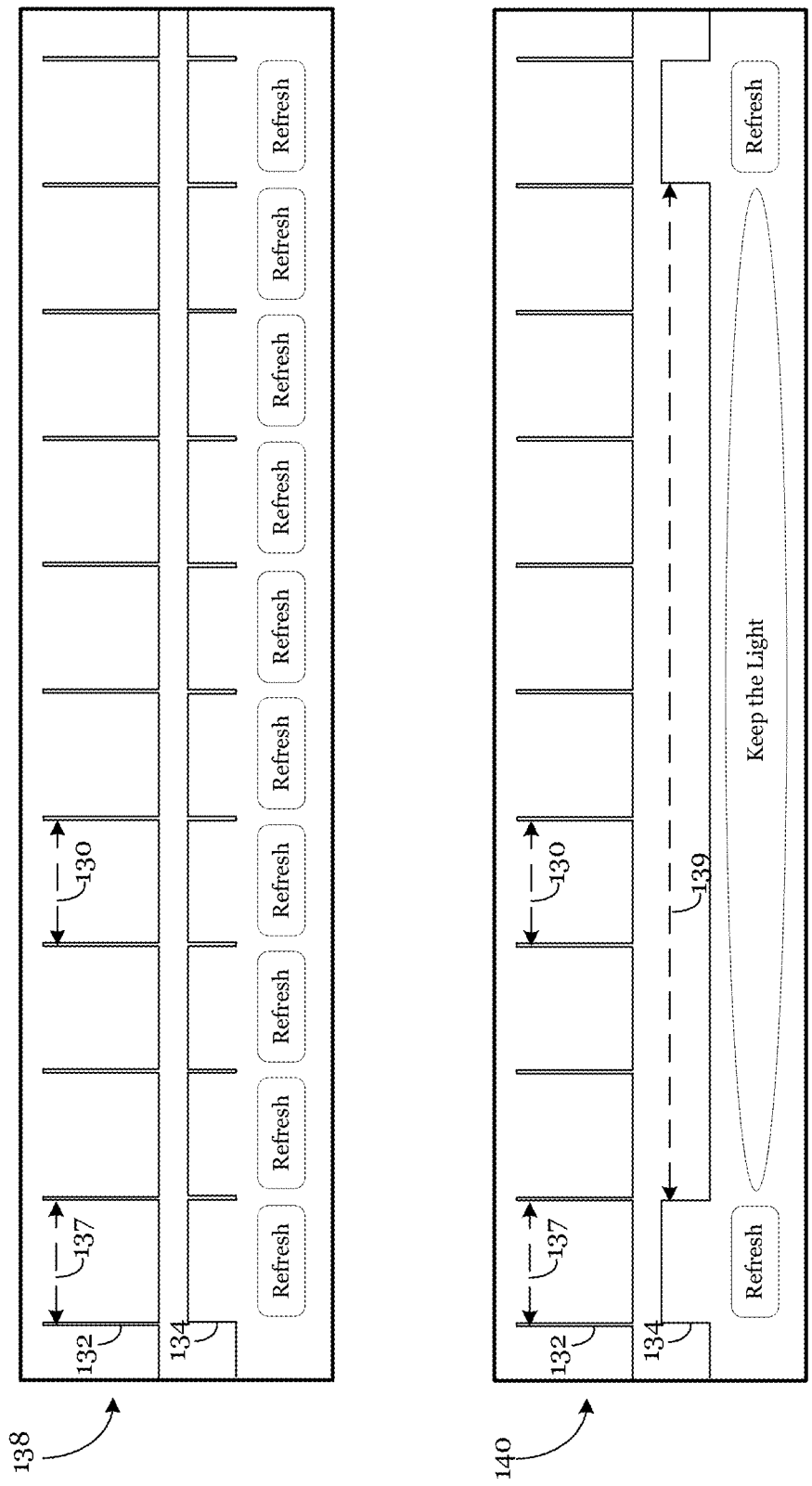
Figure 1G:
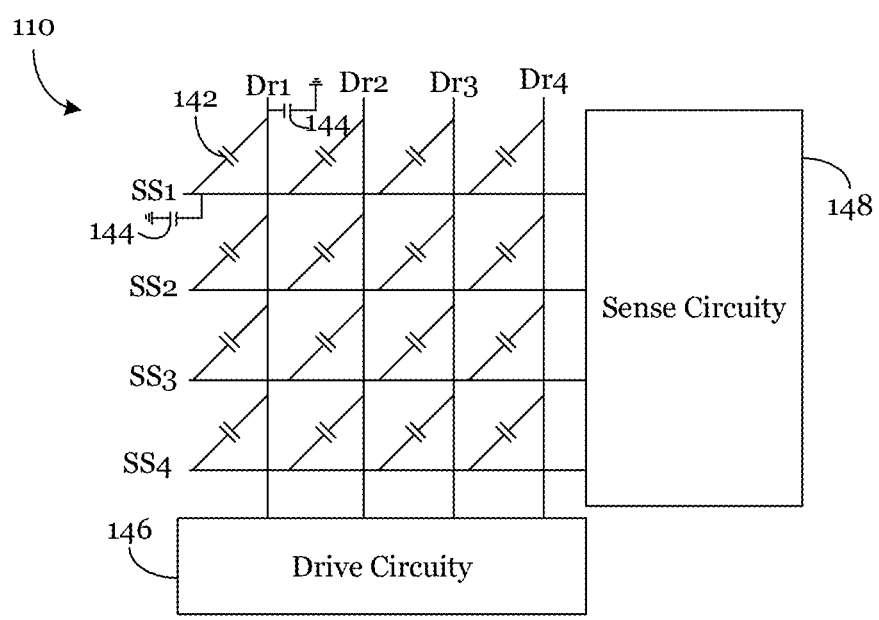
Figure 1H:
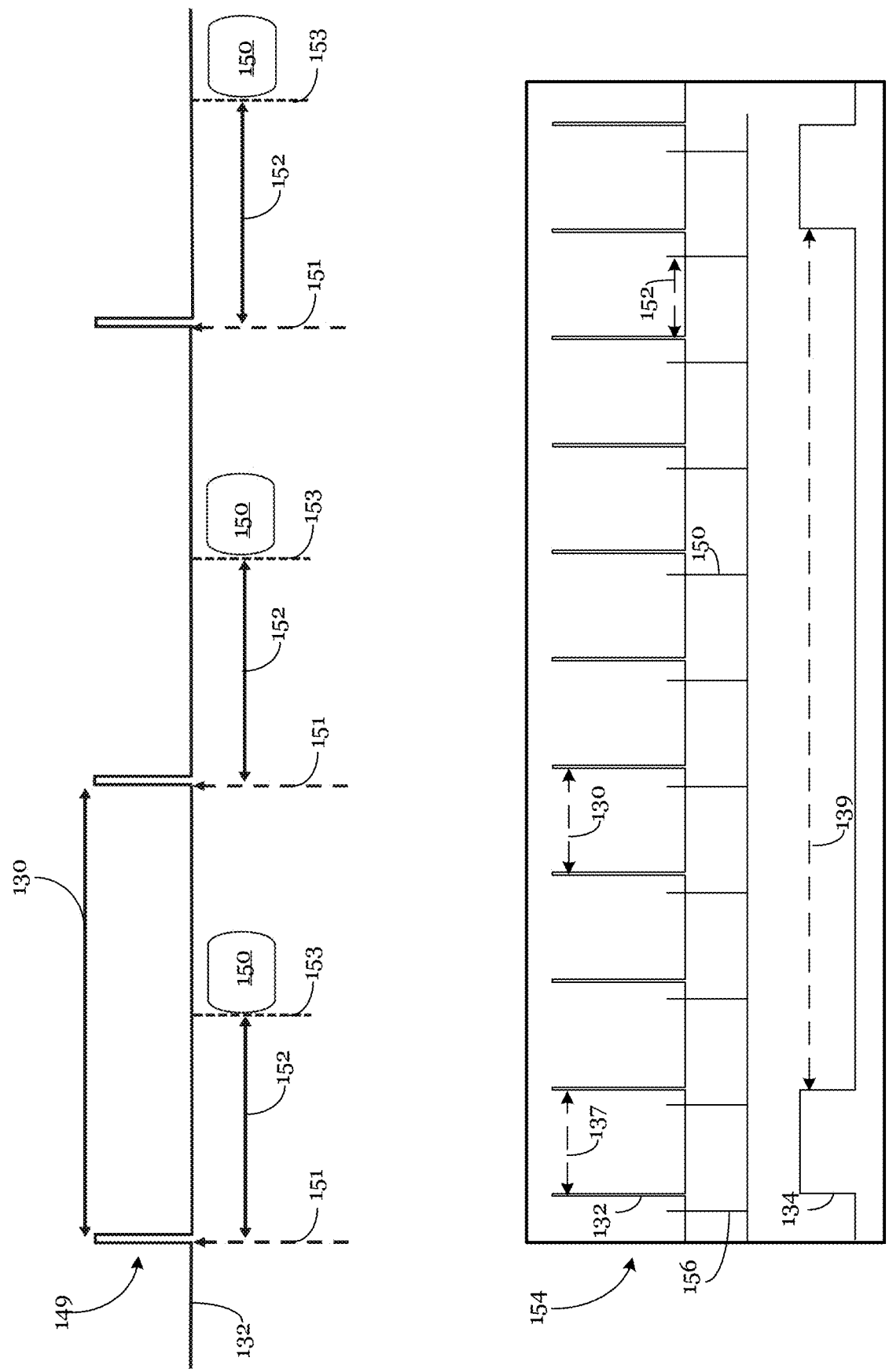

FIGS. 1A-1H illustrate an electronic device configured to prevent display flicker according to an embodiment of the present application, wherein FIG. 1A illustrates a component schematic of the electronic device, FIG. 1B illustrates a component schematic of a touchscreen, FIG. 1C illustrates a component schematic of a display stack up of the touchscreen, and FIG. 1D illustrates a component schematic of a display layer of the electronic device, FIG. 1E illustrates a graphical representation of a touchscreen being refreshed, FIG. 1F illustrates a graphical representation of a touchscreen being refreshed in active mode and low frequency display (LFD) mode, FIG. 1G illustrates a component schematic of a touch sensitive layer of the electronic device, and FIG. 1H illustrates graphical representations of a conventional timing of self-sensing scan when a touchscreen is operated in LFD mode.

Referring to FIG. 1A, an electronic device 100 may include a touchscreen controller 104, a touchscreen 106, and a system on a chip 108. The electronic device 100 may be a smart phone, a GPS device, a tablet computer, a mobile media player, a laptop, a gaming system, a personal computer, or any other electronic device that may utilize a touchscreen 106.

The touchscreen 106 may be a wide quad HD (WQHD) display, organic light emitting diode (OLED) display, an LED display, or any other type of display. The touchscreen 106 may include a plurality of pixels in a display layer 112 configured to display an image. The display layer 112 of the touchscreen 106 may include a plurality of scan lines that extend across the rows of the touchscreen 106, and data lines that extend across the columns of the touchscreen 106. The scan lines and the data lines may be connected to each of the pixels. In other words, each of the plurality of pixels may be positioned at each of the intersections between the data lines and scan lines. The touchscreen 106 may also include a touch-sensing layer configured to detect touches made on the touchscreen 106. This will be shown in more detail below.

The touchscreen controller 104 may perform various methods with respect to the touchscreen 106. In various embodiments, the touchscreen controller 104 may be a processor that analyzes information and carries out a series of executable scripts, e.g., stored in a memory 105 integrated in the touchscreen controller 104. In one or more embodiments, the processor may comprise an application-specific integrated circuit (ASIC) device, a central processing unit (CPU), or any other processing unit known in the art. In various embodiments, the touchscreen controller 104 may comprise a number of separate computing units such as cores integrated within one processor, or distinct separate processing chips.

In various embodiments, the memory 105 may be programmed for short term and/or long term memory storage. The memory 105 may be configured to store data generated by the touchscreen controller 104 and may comprise various programs to be executed in the touchscreen controller 104. The memory 105 may include both volatile and non-volatile memories.

In various embodiments, the system on a chip 108, may also be known as an application processor, and may comprise a processor, interface, circuitry, and/or the like configured to direct the flow of input and output data to the touchscreen 106 and the associated touchscreen controller 104. A memory may be integrated onto the system on a chip 108. The memory may be programmed for short term and/or long term memory storage. The memory may comprise various programs to be executed in the system on a chip 108. The memory may include both volatile and non-volatile memories. The system on a chip 108 may be configured to transmit image data and synchronization signals to the touchscreen controller 104.

In various embodiments, the synchronization signals transmitted by the system on a chip 108 may include a horizontal synchronization signal (Hsync) and a vertical synchronization signal (Vsync). The touchscreen controller 104 may receive the image data and transmit processed image data to the pixels on the touchscreen 106 based on Hsync to refresh the image displayed on the touchscreen 106.

In other words, the touchscreen controller 104 may convert the image into data signals in the form of analog voltages, hold the data signals, and transmit the data signals to each of the plurality of data lines based on the synchronization signals transmitted by the system on a chip 108. Similarly, the touchscreen controller 104 may generate and sequentially transmit scan signals to the plurality of scan lines based on the synchronization signals transmitted by the system on a chip 108.

Additionally, the touchscreen controller 104 may be configured to detect touches on the touchscreen 106 via a touch-sensing layer. In other words, the touchscreen controller 104 may be configured to send touch driving signals (TDS) to the touchscreen 106, receive touch sensing signals (TSS) in return from the touchscreen 106, process the TSS to determine coordinates of touch, and report them to the system on a chip 108. Then based on the touch data collected from scanning, the touchscreen 106 may be used by the touchscreen controller 104 to determine the coordinates of touch, and report them to the system on a chip 108. Then, the system on a chip 108 may provide an output to the touchscreen 106 based on the reported coordinates of touch.

As will be further described in more detail below, the touchscreen controller 104 may be configured to mitigate flicker by controlling the timing of self-sensing scans in LFD mode. In other words, in LFD mode, the touchscreen controller 104 may perform self-sensing scans at different start times measured with respect to a beginning of a corresponding display frame.

FIG. 1B illustrates a schematic of the touchscreen 106. In various embodiments, the touchscreen 106 may include a touch-sensing layer 110 and a display layer 112. The touch-sensing layer 110 and the display layer 112 may be situated on the front facing side of the electronic device 100.

FIG. 1C illustrates a display stack-up of the touchscreen 106. The display stack-up of the touchscreen 106 may include a plurality of layers. In various embodiments the touchscreen 106 may comprise a cover film 114, the touch-sensing layer 110, a core 118, an encapsulation film 120, and an OLED layer 122.

The OLED layer 122 may comprise a plurality of OLED elements formed across rows and columns of the touchscreen in a matrix like formation. The OLED elements may be configured to transmit light having a color (such as red, green, or blue) with a brightness based on the current they are driven with. The OLED layer 122 will be explained in more detail below.

The encapsulation film 120 may be formed and in direct contact with the OLED layer. The encapsulation film 120 may function to prevent oxygen, water, or moisture from external sources reaching into and damaging the OLED layer. The encapsulation film 120 may comprise one or more layers of material. For example, the encapsulating film may comprise silicon dioxide, silicon nitride, or any other encapsulation films known in the art.

A core 118 may be formed over the encapsulation film 120. The core 118 may be used for controlling the characteristics of the touchscreen 106 such as external light reflection, color accuracy, luminance, and so on. For example, the core 118 may include multiple layers such as a reflection control layer that includes color filters, a lens layer corresponding to each OLED element of the OLED layer 122, and the like.

The touch-sensing layer 110 may be formed over the core 118. The touch-sensing layer 110 may be a capacitive touch panel configured to detect touches made to the touchscreen 106. This will be explained in more detail below.

The cover film 114 may be a protective layer to protect the touch-sensing layer 110. The cover film 114 may comprise a transparent material such as a thin layer of glass including silicon dioxide.

The display stack-up of the touchscreen 106 described in FIG. 1C is for example purposes only and is not limited by this application. Additional layers known in the art may also be included in the display stack up of the touchscreen 106.

FIG. 1D, illustrates a schematic of the OLED layer 122 of the touchscreen according to an embodiment of the present application.

Referring to FIG. 1D, the OLED layer 122 of the touchscreen 106 may include a plurality of pixel circuits Pmi that are each connected to a plurality of scan lines S1-Sk and a plurality of data lines D1-Dj. The plurality of scan lines S1-Sk may be coupled to a scanning driver 126 and the plurality of data lines D1-Dj may be coupled to the data driver 124. The scanning driver 126 and the data driver 124 may be included in the touchscreen controller 104. The scan lines S1-Sk may be formed in rows across the OLED layer 122 while the data lines D1-Dj are formed in columns across the OLED layer 122.

Each of the scan lines S1-Sk and each of the data lines D1-Dj may be coupled to a plurality of pixel circuits Pmi that are arranged in a matrix across the OLED layer 122 of the touchscreen 106. The scan lines S1-Sk may be configured to transmit scan signals generated by the scanning driver 126 of the touchscreen controller 104 and the data lines D1-Dj may be configured to transmit data signals generated by the data driver 124 of the touchscreen controller 104 to each of the pixel circuits Pmi. Although FIG. 1D illustrates a single pixel circuit Pmi, formed at the intersection of scan line Sm and data line Di this is for example purposes only.

The plurality of scan signals may be configured to supply a turn-on voltage to a switching transistor in each of the pixel circuits. The data signals may be configured to transmit image data to each of the pixel circuits Pmi. The scan signals and the data signals may be analog voltages generated by the touchscreen controller 104 based on the image data transmitted from the system on a chip 108.

Each pixel circuit Pmi may include an organic light emitting diode (OLED). The OLED may be configured to emit light with a brightness based on a current flowing through it. As understood by those with ordinary skill in the art, the image displayed by the touchscreen 106 may be updated in a plurality of display frames. In various embodiments, each of the plurality of display frames may be defined by the vertical synchronization signal (Vsync). The frequency of Vsync may be determined based on the refresh rate of the touchscreen 106. For example the frequency of Vsync may be 30 Hz, 60 Hz, 120 Hz, 240 Hz, and so on.

In various embodiments, to conserve power the touchscreen 106 may operate in active mode or in low frequency display (LDF) mode. In active mode, the touchscreen 106 may be refreshed in each of the frames. On the other hand, in LFD mode the touchscreen 106 may be refreshed at a frequency less than the frequency of Vsync. In other words, when the touchscreen is displaying a static image or is in always on mode, the touchscreen 106 is not refreshed in every display frame, which conserves power. This will be discussed in more detail below.

FIG. 1E illustrates a graphical representation of a single display frame in which the touchscreen is updated.

Referring to graph 128, a frame 130 may be defined by the period of a vertical synchronization signal (Vsync) 132. In other words, a frame 130 is when Vsync is transmitted (i.e., Vsync 132) and ends at the next transmission of Vsync 132. In various embodiments, during the frame 130, the system on a chip 108 may transmit a horizontal synchronization signal (Hsync) 134 and the touchscreen controller 104 may update each row of pixel circuits Pmi in accordance to Hsync 134. In other words, each row of pixel circuits Pmi may be sequentially updated from top to bottom of the OLED layer 122 during the frame 130.

Referring to section 136 of graph 128 each row of pixel circuits may be updated sequentially as Hsync 134 is transmitted during the frame 130 (i.e. when Hsync is logic high). In other words, each time Hsync 134 is transmitted to the touchscreen controller 104, using the scanning driver 126, the touchscreen controller 104 may be configured to transmit a scan signal via each one of the corresponding scan lines S1-Sk. For example, a first scan signal via scan line S1 may be transmitted at a first transmission of Hsync 134 first allowing the first row of pixels to be updated, a second scan signal via scan line S2 may be transmitted at a second transmission of Hsync 134 allowing the second row of pixel circuits to be updated, and so on until the last row of pixel circuits are updated. The frequency of Hsync 134 may be determined based on the resolution of the touchscreen 106 and may be greater than the frequency of Vsync. The frequency of Hsync 134 may be determined based on the resolution of the touchscreen 106. For example, the frequency of Hsync may be greater than 100 kHz.

As explained above, in order to conserve power the touchscreen 106 may be operated in active mode or low frequency display (LFD) mode.

FIG. 1F illustrates an active mode timing diagram 138 and an LFD mode timing diagram 140 of the touchscreen 106.

Referring to the active mode timing diagram 138, the touchscreen 106 may be refreshed in each frame 130. In other words, the active refresh period 137 may be equal to the period of Vsync 132. Thus, the active refresh rate may be equal to the frequency of Vsync 132. In active mode, the system on a chip 108 may transmit Hsync 134 in each of the plurality of frames 130. Although Hsync 134 is always high when the touchscreen is refreshed, this is for example purposes only. A magnified Hsync 134 signal when Hsync 134 is high is illustrated in FIG. 1E. For sake of clarity, the high signal of Hsync 134 will be shown only as a solid line in this and subsequent figures.

On the other hand, referring to the LFD mode timing diagram 140, the LFD refresh period may be less than the period of Vsync 132. Thus, the LFD refresh rate may be less than the frequency of Vsync 132. In other words, Hsync 134 may only be transmitted by the system on a chip 108 in certain frames 130 according the LFD mode refresh rate while the touchscreen 106 is displaying a static image or is in always on mode.

FIG. 1G illustrates a schematic of the touch-sensing layer 110. In various embodiments, the touch-sensing layer 110 may comprise drive lines Dr1-Dr4 and sense lines SS1-SS4 that span the entirety of the touchscreen 106 in a grid-like fashion that are operable by the touchscreen controller 104. In various embodiments, the drive lines Dr1-Dr4 may be formed in rows across the touchscreen 106 and the sense lines SS1-SS4 may be formed in columns across the touchscreen 106. In other embodiments, the drive lines Dr1-Dr4 may be formed in columns across the touchscreen 106 and sense lines SS1-SS4 may be formed in columns across the touchscreen 106. In various embodiments, the number of drive lines may be equal to the number of sense lines. Although four drive lines and four sense lines are illustrated in FIG. 1F, this is not indicative of the number of drive and sense lines that may be present on the touch-sensing layer 110. The number of drive and sense lines used are not limited by this application.

The drive lines Dr1-Dr4 and the sense lines SS1-SS4 may overlap in certain embodiments. While FIG. 1G depicts the drive lines Dr1-Dr4 and the sense lines SS1-SS4 overlapping in an orthogonal manner, they may overlap other than orthogonally such as being interleaved or at various angles.

The drive lines Dr1-Dr4 and the sense lines SS1-SS4 may have a measurable mutual capacitance at their intersections as to form a matrix of mutual capacitors with mutual capacitances 142.

In various embodiments, the drive lines Dr1-Dr4 may be coupled to drive circuitry 146 and the sense lines SS1-SS4 may be coupled to sense circuitry 148 of the touchscreen controller 104. Alternatively, the drive circuitry 146 and the sense circuitry 148 may be incorporated into a separate touchscreen controller. As appreciated by those with ordinary skill in the art, each of the drive lines and the sense lines may also have a self-capacitance 144 that is measurable. In other words, the drive lines Dr1-Dr4 and the sense lines SS1-SS4 are operable in mutual sensing mode and a self-sensing mode.

In the mutual sensing mode, the touchscreen controller 104 may drive each row of the drive lines Dr1-Dr4 sequentially, and measure the change in the mutual capacitance 143 due to a change in a dielectric medium between a sensing line SS1-SS4 and a respective driven drive line Dr1-Dr4 using the sense circuitry 148. In various embodiments, the drive lines Dr1-Dr4 may be driven using a periodic signal such as a sine wave, a square wave, or the like.

A self-sensing scan operates by measuring a change in the self-capacitance of each of the drive lines Dr1-Dr4 (or the sense lines SS1-SS4). In other words, the self-sensing scan may include driving each of the drive lines Dr1-Dr4 (or sense lines) (with a voltage) and scanning each of the drive lines Dr1-Dr4 (or sense lines). When a human finger (or another capacitive object) is brought proximate to a drive line Dr1-Dr4 (or sense line), it adds an additional self-capacitance that can be measured.

The inventors of this application have identified that flicker may be induced by the current draw required by the touchscreen controller 104 to perform a self-sensing scan in low frequency display (LFD) mode.

FIG. 1H illustrates graphical representations of how a conventional touchscreen may be operated in low frequency display (LFD) mode.

Referring to graph 149 of FIG. 1H, conventionally, touch sensing scans may be performed in each frame in LFD mode. In various embodiments, as illustrated in graph 149, a self-sensing scan 150 may be performed in each frame 130. In other words, conventionally, self-sensing scans may be performed in the same manner regardless of the display mode. In each of the plurality of frames, after a duration of time measured after each time Vsync 132 is transmitted, a self-sensing scan 150 may be performed by the touchscreen controller 104. This duration of time is represented as self-sensing time offset 152 in FIG. 1H. The self-sensing time offset 152 may be determined based on a scan period (e.g. the desired time between self-sensing scans) 150 and the duration of a self-sensing scan 150 in active mode. Conventionally, the self-sensing start timing offset 152 may be fixed and may be less than the period of Vsync 132 (i.e. the duration of the frames 130) and may be within a range of 1 and 10 ms, for example 6 ms.

In other words, conventionally, when a touchscreen 106 is operated in LFD mode, a self-sensing scan 150 is performed at a same self-sensing start time 153 measured from the start time of a corresponding frame 151. In other words after a fixed amount of time after the start of each frame (e.g. when Vsync is high) elapses, the touchscreen controller 104 starts a self-sensing scan 150. Therefore, an additional current draw occurs at the same time in each frame 130.

Therefore, as illustrated by self-sensing scan signal 156 in timing diagram 154, a self-sensing scan 150 may be performed (i.e. the self-sensing scan signal 156 may peak) at the same position in each frame 130.

Although when the touchscreen is refreshed Hsync 134 is always high this is for example purposes only. When Hsync 134 is high it takes the shape of the zoomed in Hsync shown in FIG. 1E.

The inventors identified that because a self-sensing scan is performed at a same self-sensing start time 153 in each frame, the additional current draw for a self-sensing scan 150 may occur while the same row is updated in each refresh. For example, the self-sensing scan may be performed while the $100^{th}$ row of pixels is being updated every time the touchscreen 106 is refreshed. The inventors of this application have identified that the combination of the lower refresh rate along with the consistent self-sensing start time 153 of self-sensing scans in each frame may be responsible for noticeable flicker to the user.

In various embodiments of the present application, if the touchscreen controller 104 determines that the touchscreen 104 is being operated in LFD mode, the touchscreen 104 may perform self-sensing scans 150 at different self-sensing time offsets 152 in each of the plurality of frames 130 (if performed at all). When the touchscreen 106 is operated in LFD mode, the touchscreen controller 104 may determine different self-sensing time offsets 152 based on the self-sensing time offset 152 in the immediately previous frame 130. In other words, in LFD mode, the touchscreen controller 104 may determine a self-sensing timing offset 152 for a current frame based on the self-sensing timing offset 152 of the immediate previous frame, a self-sensing scan interval, and a period of Vsync 132. This will be described in more detail below.

Advantageously, in embodiments of the present application, in LFD mode, self-sensing scans 150 may be performed at staggered start times in each of the plurality of frames (if performed at all). One advantage of this is that the timing of the additional current draw while the touchscreen 106 is refreshed at the lower rate would be staggered and not occur when the same row of pixels is refreshed every time.

Figure 2:
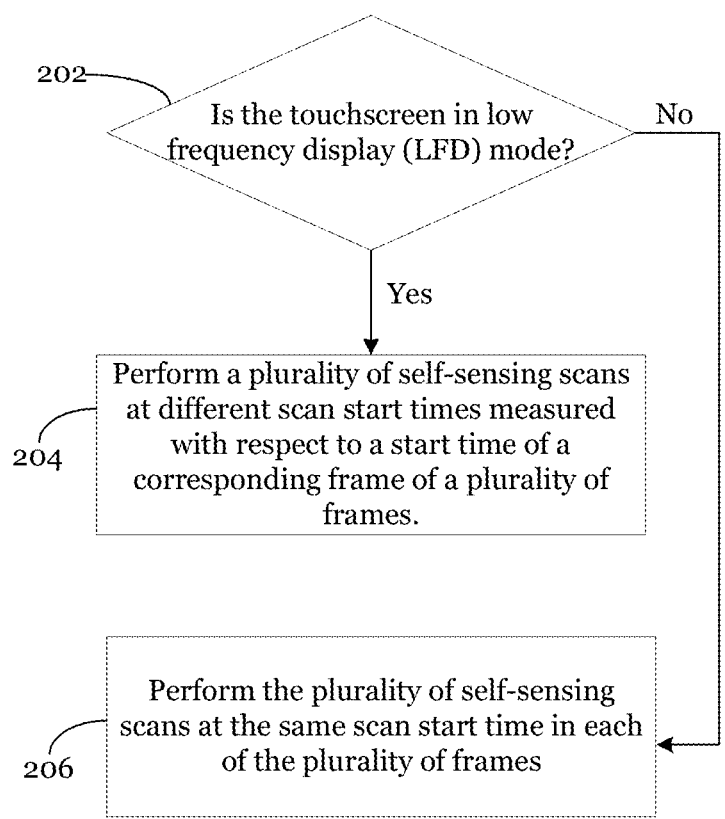
FIG. 2 illustrates a process flow of performing self-sensing scans on a touchscreen without inducing flicker when the touchscreen is operation in active mode or low frequency display mode according to an embodiment of the present application.

FIG. 2 illustrates a process flow of performing self-sensing scans on a touchscreen without inducing flicker when the touchscreen is operation in active mode or low frequency display (LFD) mode according to an embodiment of the present application.

As illustrated in block 202, and described with reference to FIGS. 1A, 1E-F and 1H, the touchscreen controller 104 determines whether the touchscreen is being operated in low frequency display (LFD) mode.

If the touchscreen controller 104 determines that the touchscreen 106 is being operated in LFD mode, the method proceeds to block 204 and self-sensing scans 150 are performed at staggered start times.

As next illustrated in block 204, and described with reference to FIGS. 1A, 1E-F, and 1H in response to determining that the touchscreen 106 is in the LFD mode, the touchscreen controller 104 may perform a plurality of self-sensing scans 150 at different start times 153 measured with respect to a start time of a corresponding frame 151. In various embodiments, when the touchscreen 106 is in LFD mode, a self-sensing scan 150 may not be performed in each frame 130. This will be described in more detail in FIGS. 4A-4B below.

In other words, the touchscreen controller 104 may stagger the start times of self-sensing scans 150 while the touchscreen 106 is in LFD mode. Advantageously, the staggered start times in LFD mode may result in a self-sensing scan 150 being performed while a different row of pixels Pmi are updated in each refresh. One advantage of this is that the additional current draw will occur while a different row of pixels is updated preventing noticeable flicker to the user in LFD mode.

On the other hand, if the touchscreen controller 104 determines the touchscreen 106 is being operated in active mode, the method proceeds to block 206 and a self-sensing scan 150 is performed in each frame 130 at a same start time of a corresponding frame 151. A self-sensing scan may be performed in the same position in each frame 130 after a fixed self-sensing time offset 152 elapses. When the touchscreen 106 is operated in active mode, each self-sensing scan 150 is performed at a same start time 153 in each frame 130. In other words, after a fixed amount of time elapses after a start time of a corresponding frame 151 (e.g. after Vsync 132 is high), the touchscreen controller 104 starts a self-sensing scan.

Figure 3:
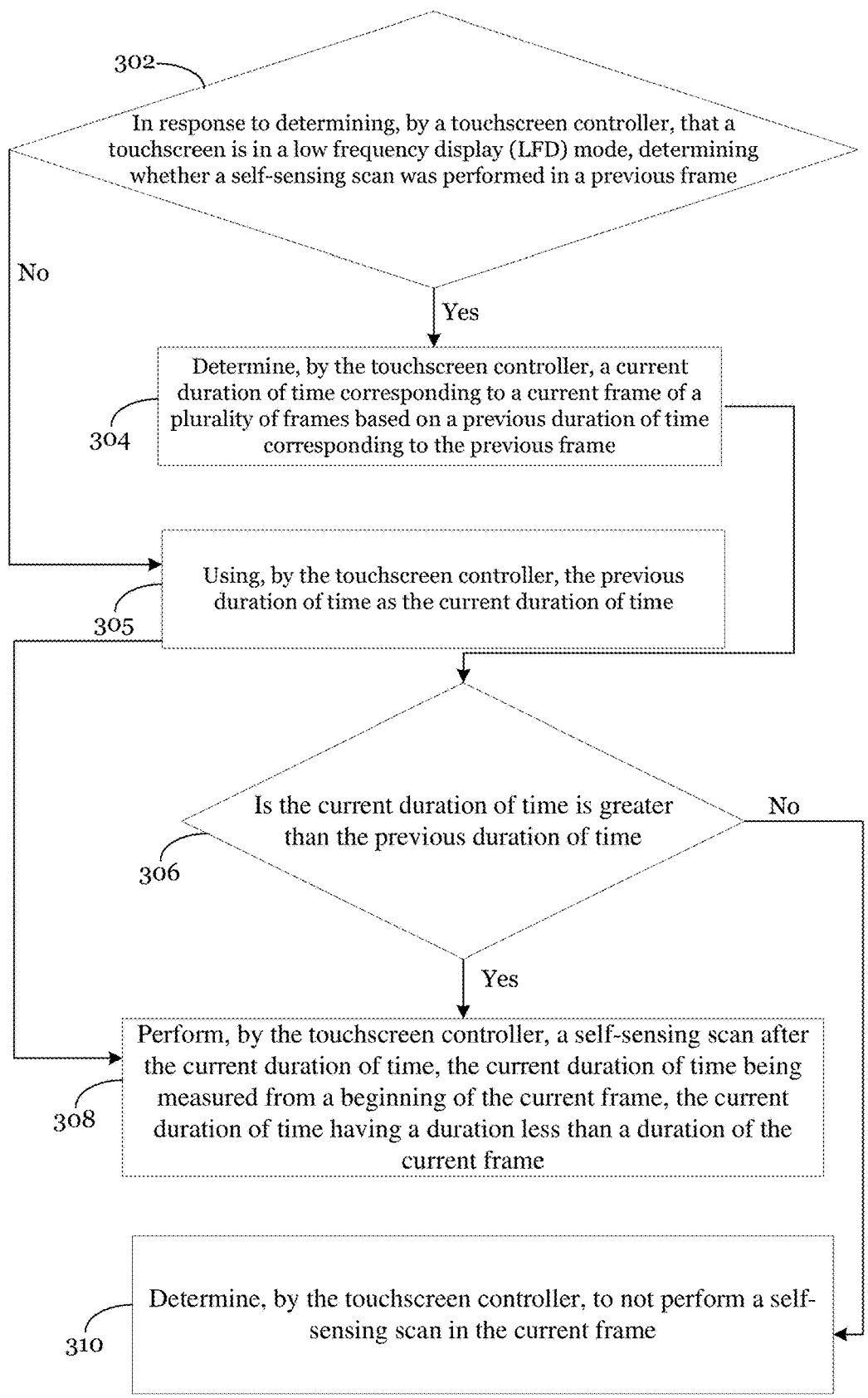
FIG. 3 illustrates a process flow for preventing flicker when a touchscreen is being operated in low frequency display (LFD) mode according to an embodiment of the present application.

FIG. 3 illustrates a process flow for preventing flicker when a touchscreen is being operated in low frequency display (LFD) mode according to an embodiment of the present application.

As illustrated in block 302, and described with reference to FIGS. 1A, 1E-F, and 1H, in response to the touchscreen controller 104 determining that the touchscreen 106 is being operated in low frequency display (LFD) mode, the touchscreen controller 104 may determine whether a self-sensing scan 150 was performed in a previous frame of a plurality of frames 130. If a self-sensing scan 150 was performed in the a previous frame, the method proceeds to block 304.

On the other hand if a self-sensing scan 150 was not performed in a previous frame, the method proceeds to blocks 305 and 310. This will be described below.

As next illustrated in block 304, if a self-sensing scan 150 was performed in a previous frame, the touchscreen controller 104 may determine a current duration of time corresponding to a current frame of the plurality frames based on a previous duration of time corresponding to a previous frame. As described above, previous frame and the current frame may be distinguished by the frequency of the vertical synchronization signal (Vsync) 132. In other words, the previous frame may be the frame that immediately precedes the current frame. The previous duration of time may be determined based on the immediately preceding frame in the same manner described with respect to the current duration of time described below. Alternatively, if the previous frame is the first frame of the plurality of frames, the previous duration of time may be equal to the fixed self-sensing time offset 152 used in active mode.

In various embodiments, if a self-sensing scan 150 was performed in the previous frame, the current duration of time may be determined based on the previous duration of time, a self-sensing scan interval, and a period of Vsync 132. In other words, for example, the current duration of time may be determined using Eq. 1.

$$\Delta t(N)=(\Delta t(N-1)+S)\% \ P(\text{Vsync}) \qquad \text{Eq. 1}$$

Where Δt(N) represents the current duration of time, Δt(N−1) represents the previous duration of time, S represents the self-sensing scan interval, and P(Vsync) represents a period of Vsync 132. In various embodiments, the current duration of time may be less than the duration of the current frame (e.g. the period of Vsync 132).

In various embodiments, the self-sensing scan interval may be determined based on the frequency of self-sensing scans if the touchscreen 106 were in active mode. In other words, the self-sensing interval may be equal to the period of time that elapses between self-sensing scans in active mode. In various embodiments, the frequency of self-sensing scans in active mode may be less than the frequency of Vsync. In other words, the self-sensing scan interval may be greater than the period of Vsync 132. The self-sensing scan interval may be equal to the touch report rate of the touchscreen 106. For example the self-sensing scan interval may be equal to 120 Hz, 240 Hz, 480 Hz, 720 Hz, and so on.

As next illustrated in block 306, whether the current duration of time is greater than the previous duration of time is determined by the touchscreen controller 104. If the current duration of time is greater than the previous duration of time, the method proceeds to block 308 and a self-sensing scan 150 is performed in the current frame after the current duration of time. In various embodiments, the current duration of time may be measured from a beginning of the current frame. In other words, the current duration of time may the time that elapses between the start time of the current frame and the start time 153 of the current frame.

On the other hand, if the current duration of time is not greater than the previous duration of time, the method proceeds to block 310 and the touchscreen controller 104 determines not perform a self-sensing scan 150 in the current frame.

Also, as described above, referring back to block 302, if a self-sensing scan 150 was not performed in the previous frame, the method proceeds to blocks 305 and 308. The touchscreen controller 104 uses the previous duration of time as the current duration of time, and performs a self-sensing scan 150 in the current frame after the current duration of time.

Figure 4B:
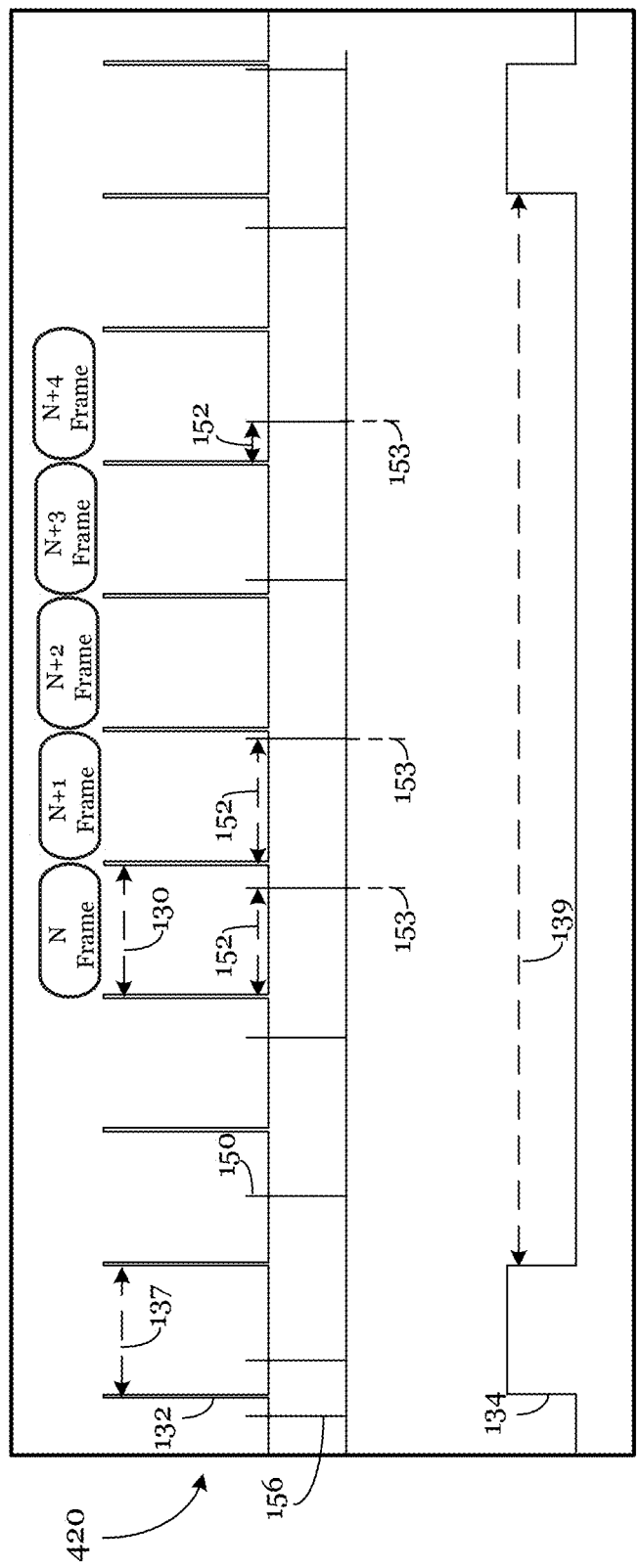

FIGS. 4A-4B illustrates schematic diagrams for preventing flicker when a touchscreen is in LFD mode according to an embodiment of the present application, where FIG. 4A illustrates a schematic diagram for calculating a duration of time corresponding to a plurality of frames, and FIG. 4B illustrates a timing diagram for preventing flicker when a touchscreen is in LFD mode.

Referring to FIG. 4A, a Nth frame, N+1 frame, N+2 frame, N+3 frame, and N+4 frame may each be distinguished by a vertical synchronization signal (Vsync) 132 having a frequency of 120 Hz. Although a Vsync having a frequency of 120 Hz is used, this is for example purposes only and any suitable frequency may be used.

Also, for example purposes only, it is assumed that the touchscreen 106 is being operated in LFD mode, the self-sensing interval is 10 ms (e.g. a self-scan frequency of 100 Hz in active mode), a first duration of time 404 corresponding to the Nth frame is equal to 6 ms, and a self-sensing scan 150 was performed in the Nth frame.

Next based on a determination that a self-sensing scan 150 was performed in the Nth frame and the touchscreen 106 is in LFD mode, the touchscreen controller 104 may determine a second duration of time 406 corresponding to the N+1 frame using Eq. 1 as follows:

$$\Delta t(N+1)=(\Delta t(N)+S)\% \ P(\text{Vsync})=(6 \text{ ms}+10 \text{ ms})\% \ 8.3 \text{ ms}=7.7 \text{ ms}$$

Then because 7.7 ms is greater than 6 ms (i.e. the second duration of time 406 is greater than the first duration of time 404), the touchscreen controller 104 may perform a self-sensing scan 7.7 ms after the start of the N+1 frame.

Next, because a self-sensing scan 150 was performed in the N+1 frame, a third duration of time 408 corresponding to the N+2 frame may be determined based on the second duration of time 406 using Eq. 1 as follows:

$$\Delta t(N+2)=(\Delta t(N+1)+S)\% \ P(\text{Vsync})=(7.7 \text{ ms}+10 \text{ ms})\% \ 8.3 \text{ ms}=1.1 \text{ ms}$$

However, because 1.1 ms is less than 7.7 ms, a self-sensing scan will not be performed in the N+2 frame. In the same manner described above, because a scan is not performed in the N+2, frame the third duration of time 408 is carried over to the next frame. In other words, a fourth duration of time 410 corresponding to the N+3 frame is equal to 1.1 ms. Then, a self-sensing scan 150 may be performed 1.1 ms after the start of the N+3 frame.

Next, because a self-sensing scan 150 was performed in the N+3 frame, a fifth duration of time 412 corresponding to the N+4 frame may be determined based on the fourth duration of time 408 using Eq. 1 as follows:

$$\Delta t(N+4)=(\Delta t(N+3)+S)\% \ P(\text{Vsync})=(1.1 \text{ ms}+10 \text{ ms})\% \ 8.3 \text{ ms}=2.8 \text{ ms}$$

Then because 2.8 ms is greater than 1.1 ms (i.e. the fifth duration of time 412 is greater than the fourth duration of time 410), the touchscreen controller 104 may perform a self-sensing scan 150, 2.8 ms after the start of the N+4 frame.

Advantageously as described above, this results in staggered start times of self-sensing scans and prevents display flicker in LFD mode.

FIG. 4B illustrates a timing diagram 420 corresponding to the example described in FIG. 4A.

Referring to FIG. 4B, when the touchscreen 106 is in low frequency (LFD) mode, if the touchscreen controller 104 determines that a self-sensing scan 150 is performed in a frame 130, each self-sensing scan 150 has a different self-sensing timing offset 152. In other words, each self-sensing scan 150 is performed at a different start times 153 (i.e. staggered start times) within a frame 130 in LFD mode.

As illustrated in the timing diagram 420, a self-sensing scan 150 may be performed (i.e. the self-sensing scan signal 156 may peak) at a different start times 153 (if performed at all) within a frame 130. In other words, as described above, a self-sensing timing offset 152 and whether a self-sensing scan 150 should be performed in a current frame is determined based on the self-sense timing offset 152 of the previous frame.

For example, referring back to the example in FIG. 4A, because a self-sensing scan 150 was performed in frame N, the second duration of time 406 may be determined, e.g., using Eq. 1. Because the second duration of time 406 is greater than the self-sense timing offset 152 of the N frame (e.g. the first duration of time 404), the second duration of time 406 may be used as the self-sense timing offset 152 of the N+1 frame. Then, a self-sensing scan 150 may be performed at a start time 153 in the N+1 frame.

Next, because a self-sensing scan was performed in the N+1 frame the third duration of time 408 may be determined using Eq. 1. However, because the third duration of time 408 is less than the self-sense timing offset 152 of the N+1 frame, a self-sensing scan 150 is not performed in the N+2 frame. Therefore, as illustrated in the timing diagram 420, the self-sensing scan signal 156 does not peak in the N+2 frame. The third duration of time 408 is then used as the self-sensing timing offset 152 of the N+3 frame.

Next, because a self-sensing scan 150 was performed in the N+3 frame, the fifth duration of time 412 may be determined using Eq. 1. Because the fifth duration of time 412 is greater than the self-sense timing offset 152 of the N+3 frame (e.g. the fourth duration of time 410), the fifth duration of time 412 may be used as the self-sense timing offset 152 of the N+4 frame. Then a self-sensing scan 150 may be performed at a start time 153 in the N+4 frame.

Example embodiments of the invention are summarized here. Other embodiments can also be understood from the entirety of the specification as well as the claims filed herein.

Example 1. A method for operating an electronic device, the method including: in response to determining, by a touchscreen controller, that a touchscreen is in a low frequency display (LFD) mode, determining whether a self-sensing scan was performed in a previous frame of a plurality of frames; in response to determining, by the touchscreen controller that a self-sensing scan was performed in the previous frame, determining a current duration of time corresponding to a current frame of the plurality of frames based on a previous duration of time corresponding to the previous frame, the previous frame being a frame immediately preceding the current frame; determining, by the touchscreen controller, whether the current duration of time is greater than the previous duration of time; and in response to determining that the current duration of time is greater than the previous duration of time, performing, by the touchscreen controller, a self-sensing scan after the current duration of time, the current duration of time being measured from a beginning of the current frame, the current duration of time having a duration less than a duration of the current frame.

Example 2. The method of example 1, where determining the current duration of time includes: determining a sum of the previous duration of time and a self-sensing scan interval; and computing a modulus between the sum and a period of each of the plurality of frames.

Example 3. The method of one of examples 1 or 2, further including receiving, by the touchscreen controller, a vertical synchronization (Vsync) signal at a first frequency, the first frequency distinguishing each of the plurality of frames.

Example 4. The method of one of examples 1 to 3, where in response to determining that the touchscreen is in the LFD mode, refreshing the touchscreen at a second frequency, the second frequency being less than the first frequency.

Example 5. The method of one of examples 1 to 4 further including, in response to determining that the current duration of time is not greater than the previous duration of time, determining, by the touchscreen controller, not to perform a self-sensing scan in the current frame.

Example 6. The method of one of examples 1 to 5, further including, in response to determining that a self-sensing scan was not performed in the previous frame, using the previous duration of time as the current duration of time.

Example 7. The method of one of examples 1 to 6, where the touchscreen is a wide quad high definition (WQHD) display.

Example 8. A method for operating an electronic device, the method including: determining, by a touchscreen controller, whether a touchscreen is in a low frequency display (LFD) mode; and in response to determining that the touchscreen is in the LFD mode, performing a plurality of self-sensing scans, a brightness of the touchscreen before, during, and after each of the self-sensing scans being maintained by starting each of the self-sensing scans at different scan start times measured with respect to a start time of a corresponding frame of a plurality of frames.

Example 9. The method of example 8, where each scan start time is determined based on the scan start time corresponding to an immediately preceding frame.

Example 10. The method of one of examples 8 or 9, where each of the plurality of frames are distinguished by a frequency of a vertical synchronization (Vsync) signal.

Example 11. The method of one of examples 8 to 10, further including determining, by the touchscreen controller, to skip performing a self-sensing scan in a frame in response to determining that a scan start time corresponding to the frame is less than a start time corresponding to an immediately preceding frame.

Example 12. The method of one of examples 8 to 11, further including, determining by the touchscreen controller that a scan start time corresponding to a frame is equal to a scan start time corresponding to an immediately preceding frame in response to determining that a self-sensing scan is not performed in the immediately preceding frame.

Example 13. The method of one of examples 8 to 12, further including in response to determining that the touchscreen is not in the LFD mode, performing the plurality of self-sensing scans, at the same scan start time in each of the plurality of frames.

Example 14. A device including: a touchscreen; a touchscreen controller; a memory for storing a program to be executed in the touchscreen controller, the program including instructions when executed cause the touchscreen controller to: determine, that the touchscreen is in a low frequency display (LFD) mode; in response to determining, that the touchscreen is in the LFD mode, determine whether a self-sensing scan was performed in a previous frame of a plurality of frames; in response to determining that a self-sensing scan was performed in previous first frame of a plurality of frames, determine a current duration of time corresponding to a current frame of a plurality of frames based on a previous duration of time corresponding to a previous frame, the previous frame being a frame immediately preceding the current frame; determine, whether the current duration of time is greater than the previous duration of time; and in response to determining that the current duration of time is greater than the previous duration of time, perform a self-sensing scan after the current duration of time, the current duration of time being measured from a beginning of the current frame, the current duration of time having a duration less than a duration of the current frame.

Example 15. The device of example 14, where the instructions to determine the current duration of time further include instructions to: determine a sum of the previous duration of time and a self-sensing scan interval; and compute a modulus between the sum and a period of each of the plurality of frames.

Example 16. The device of one of examples 14 or 15, where the program further includes instructions to: receive, a vertical synchronization (Vsync) signal at a first frequency, the first frequency distinguishing each of the plurality of frames.

Example 17. The device of one of examples 14 to 16, where the program further includes instructions to: in response to determining, that the touchscreen is in the LFD mode, refresh the touchscreen at a second frequency, the second frequency being less than the first frequency.

Example 18. The device of one of examples 14 to 17, where the program further includes instructions to: in response to determining that the current duration of time is not greater than the previous duration of time, determine, not to perform a self-sensing scan in the current frame.

Example 19. The device of one of examples 14 to 18, where the program further includes instructions to: in response to determining that a self-sensing scan was not performed in the previous frame, set the current duration of time as the previous duration of time.

Example 20. The device of one of examples 14 to 19, where the touchscreen is a wide quad high definition (WQHD) display.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
   in response to determining, by a touchscreen controller, that a touchscreen is in a low frequency display (LFD) mode, determining whether a self-sensing scan was performed in a previous frame of a plurality of frames;
   in response to determining, by the touchscreen controller that a self-sensing scan was performed in the previous frame, determining a current duration of time corresponding to a current frame of the plurality of frames based on a previous duration of time corresponding to the previous frame, the previous frame being a frame immediately preceding the current frame;
   determining, by the touchscreen controller, whether the current duration of time is greater than the previous duration of time; and
   in response to determining that the current duration of time is greater than the previous duration of time, performing, by the touchscreen controller, a self-sensing scan after the current duration of time, the current duration of time being measured from a beginning of the current frame, the current duration of time having a duration less than a duration of the current frame.

2. The method of claim 1, wherein determining the current duration of time comprises:
   determining a sum of the previous duration of time and a self-sensing scan interval; and
   computing a modulus between the sum and a period of each of the plurality of frames.

3. The method of claim 1, further comprising receiving, by the touchscreen controller, a vertical synchronization (Vsync) signal at a first frequency, the first frequency distinguishing each of the plurality of frames.

4. The method of claim 3, wherein in response to determining that the touchscreen is in the LFD mode, refreshing the touchscreen at a second frequency, the second frequency being less than the first frequency.

5. The method of claim 1 further comprising, in response to determining that the current duration of time is not greater than the previous duration of time, determining, by the touchscreen controller, not to perform a self-sensing scan in the current frame.

6. The method of claim 1, further comprising, in response to determining that a self-sensing scan was not performed in the previous frame, using the previous duration of time as the current duration of time.

7. The method of claim 1, wherein the touchscreen is a wide quad high definition (WQHD) display.

8. A device comprising:
   a touchscreen;
   a touchscreen controller;
   a memory for storing a program to be executed in the touchscreen controller, the program comprising instructions when executed cause the touchscreen controller to:
      determine, that the touchscreen is in a low frequency display (LFD) mode;
      in response to determining, that the touchscreen is in the LFD mode, determine whether a self-sensing scan was performed in a previous frame of a plurality of frames;
      in response to determining that a self-sensing scan was performed in a previous frame of a plurality of frames, determine a current duration of time corresponding to a current frame of a plurality of frames based on a previous duration of time corresponding to a previous frame, the previous frame being a frame immediately preceding the current frame;
      determine, whether the current duration of time is greater than the previous duration of time; and
      in response to determining that the current duration of time is greater than the previous duration of time, perform a self-sensing scan after the current duration of time, the current duration of time being measured from a beginning of the current frame, the current duration of time having a duration less than a duration of the current frame.

9. The device of claim 8, wherein the instructions to determine the current duration of time further comprise instructions to:
   determine a sum of the previous duration of time and a self-sensing scan interval; and
   compute a modulus between the sum and a period of each of the plurality of frames.

10. The device of claim 8, wherein the program further comprises instructions to: receive, a vertical synchronization (Vsync) signal at a first frequency, the first frequency distinguishing each of the plurality of frames.

11. The device of claim 10, wherein the program further comprises instructions to: in response to determining, that the touchscreen is in the LFD mode, refresh the touchscreen at a second frequency, the second frequency being less than the first frequency.

12. The device of claim 8, wherein the program further comprises instructions to: in response to determining that the current duration of time is not greater than the previous duration of time, determine, not to perform a self-sensing scan in the current frame.

13. The device of claim 8, wherein the program further comprises instructions to: in response to determining that a self-sensing scan was not performed in the previous frame, set the current duration of time as the previous duration of time.

14. The device of claim 8, wherein the touchscreen is a wide quad high definition (WQHD) display.

15. A method for operating an electronic device, the method comprising:
   in response to determining, by a touchscreen controller, that a touchscreen is in a low frequency display (LFD)

mode, determining whether a self-sensing scan was performed in a previous frame of a plurality of frames;

in response to determining, by the touchscreen controller that a self-sensing scan was performed in the previous frame, determining a current duration of time corresponding to a current frame of the plurality of frames based on a previous duration of time corresponding to the previous frame, the previous frame being a frame immediately preceding the current frame;

determining, by the touchscreen controller, whether the current duration of time is greater than the previous duration of time;

in response to determining that the current duration of time is greater than the previous duration of time, performing, by the touchscreen controller, a self-sensing scan after the current duration of time, the current duration of time being measured from a beginning of the current frame, the current duration of time having a duration less than a duration of the current frame; and performing a plurality of self-sensing scans, a brightness of the touchscreen before, during, and after each of the self-sensing scans being maintained by starting each of the self-sensing scans at different scan start times measured with respect to a start time of a corresponding frame of a plurality of frames, the performing of the plurality of self-sensing scans comprising performing, by the touchscreen controller, the self-sensing scan after the current duration of time.

16. The method of claim 15, wherein determining the current duration of time comprises:

determining a sum of the previous duration of time and a self-sensing scan interval; and computing a modulus between the sum and a period of each of the plurality of frames.

17. The method of claim 15, further comprising receiving, by the touchscreen controller, a vertical synchronization (Vsync) signal at a first frequency, the first frequency distinguishing each of the plurality of frames.

18. The method of claim 17, wherein in response to determining that the touchscreen is in the LFD mode, refreshing the touchscreen at a second frequency, the second frequency being less than the first frequency.

19. The method of claim 15, further comprising, in response to determining that the current duration of time is not greater than the previous duration of time, determining, by the touchscreen controller, not to perform a self-sensing scan in the current frame.

20. The method of claim 15, further comprising, in response to determining that a self-sensing scan was not performed in the previous frame, using the previous duration of time as the current duration of time.

21. The method of claim 15, wherein the touchscreen is a wide quad high definition (WQHD) display.

* * * * *